US009617915B2

(12) United States Patent
Agostinelli et al.

(10) Patent No.: US 9,617,915 B2
(45) Date of Patent: Apr. 11, 2017

(54) METHOD OF INCREASING ELECTRICITY OUTPUT DURING HIGH DEMAND

(71) Applicant: ALSTOM Technology Ltd, Baden (CH)

(72) Inventors: Gian Luigi Agostinelli, Zürich (CH); Andre Burdet, Villars sur Glane (CH); Michal Tadeusz Bialkowski, Untersiggenthal (CH)

(73) Assignee: General Electric Technology GmbH, Baden (CH)

( * ) Notice: Subject to any disclaimer, the term of this patent is extended or adjusted under 35 U.S.C. 154(b) by 594 days.

(21) Appl. No.: 14/017,911

(22) Filed: Sep. 4, 2013

(65) Prior Publication Data

US 2014/0060064 A1   Mar. 6, 2014

(30) Foreign Application Priority Data

Sep. 4, 2012  (EP) .................................. 12182969

(51) Int. Cl.
  *F01K 13/00*  (2006.01)
  *F02C 6/04*  (2006.01)
  *F01K 3/00*  (2006.01)

(52) U.S. Cl.
  CPC .............. F02C 6/04 (2013.01); F01K 3/00 (2013.01); F01K 13/00 (2013.01); *Y02E 20/14* (2013.01); *Y02E 20/16* (2013.01)

(58) Field of Classification Search
  CPC ... F01K 3/00; F01K 3/02; F01K 13/00; F01K 13/02; F01K 23/10; F01K 25/065; F01K 25/103; F02C 6/04; F02C 6/14
  See application file for complete search history.

(56) References Cited

U.S. PATENT DOCUMENTS

| 4,942,734 | A | 7/1990 | Markbreiter et al. |
| 8,726,663 | B2 * | 5/2014 | Schroder .................. F01K 3/12 |
| | | | 122/7 B |
| 2005/0166569 | A1 | 8/2005 | Christensen et al. |
| 2011/0139003 | A1 | 6/2011 | Joh et al. |
| 2011/0289899 | A1 | 12/2011 | De La Cruz Garcia et al. |
| 2014/0202157 | A1 * | 7/2014 | Shinnar ..................... F01K 3/00 |
| | | | 60/652 |

OTHER PUBLICATIONS

Lombardi, "*Life Cycle Assessment (LCA) and Exegetic Life Cycle Assessment (ELCA) of a Semi-Closed Gas Turbine Cycle with CO2 Chemical Absorption*", Energy Conv & Mgmt, vol. 42, Jan. 2001, p. 101-114.

* cited by examiner

*Primary Examiner* — Arun Goyal
(74) *Attorney, Agent, or Firm* — GE Global Patent Operation; Cynthia W. Flanigan

(57) ABSTRACT

A method of operating a combined cycle power generating system to increase the operating flexibility of the plant. The method also includes operating a thermal storage unit in a heat storing mode and in a heat releasing mode.

18 Claims, 3 Drawing Sheets

METHOD OF INCREASING ELECTRICITY OUTPUT DURING HIGH DEMAND

CROSS-REFERENCE TO RELATED APPLICATIONS

This application claims priority to European Application 12182969.1 filed Sep. 4, 2012, the contents of which are hereby incorporated in its entirety.

TECHNICAL FIELD

The present application relates to a method of operating a combined cycle power generating system, a combined cycle power generating system and a combined cycle power plant.

BACKGROUND

Fossil based power plants are facing a more and more variable operating regime as response to the increasing installed capacity of renewable electricity power units and as a consequence of seasonal and daily electricity demand variation.

Especially combined cycle power plants (CCPP's) are operated in an extremely cycling mode and in some cases CCPP's are shut down and restarted daily.

The cost of electricity of a power plant based on a gas turbine and equipped with a carbon dioxide capturing system is significant. The electricity prices vary depending on if the demand is high or low. When a lot of industries are closed for the day or not running at full capacity, e.g. during night time, the electricity prices are decreased. When the industries are working at full capacity, e.g. during day time, the electricity prices are increased due to the high demand.

A typical gas turbine, such as a gas turbine in a gas turbine plant for power generation, comprises a compressor for compression of inlet air, a combustor where the compressed air is mixed with fuel and where the mixture is ignited, and a turbine where exhaust gas from the combustor is expanded.

Exhaust gas emitted from a gas turbine generally comprises pollutants of environmental concern, such as carbon dioxide ($CO_2$).

The exhaust gas from a gas turbine generally comprises $SO_x$ and other impurities and contaminants.

When a fossil based power plant is equipped with a carbon dioxide capturing system and the carbon dioxide capturing system is in operation the energy increase needed is substantial compared to power plant without a carbon dioxide capturing system. The power output compared to the equivalent thermal input is reduced by 15-20%, i.e. a power penalty of 15-20%, when a power plant comprising a carbon dioxide capturing system instead of a power plant not comprising a carbon dioxide capturing system. If the carbon dioxide capturing system was to be switch off the power penalty would be much lower.

It is concluded that there is a need for improving the flexibility of operation and electricity consumption of power plants based on gas turbines and equipped with carbon dioxide capturing systems.

SUMMARY

The overall performance in terms of cost of electricity of a power plant based on a gas turbine and equipped with a carbon dioxide capturing system is improved if heat energy is transported between different parts of the process and parts of electricity intensive operations is postponed until the electricity prices are low.

The present disclosure relates to a method of operating a power plant which highly increases the operating flexibility of the plant. Integration of a buffering system into a power plant equipped with a carbon dioxide capturing system allows an increased operating flexibility versus variable electricity price and electricity demand from the grid.

By improving the flexibility of the process the power penalty could be lowered during periods of high electricity demand from the grid, leaving a higher output while still fulfilling the carbon dioxide capture requirement. Correspondingly, the flexibility allows an increased penalty during periods of low electricity demand from the grid. By maximizing the output during periods of high electricity demand and high electricity price the overall costs may be lowered. Energy intensive parts, e.g. by input of electrical energy, of the process are partly postponed to parts of the day when electricity prices and the electricity demand from the grid are lower. Heat energy generated may be stored until the demand for heat energy increases during high load on the process, i.e. when the electricity demand from the grid increases or is high.

By improving the operating flexibility the power plants may also decrease the power penalty of the overall system.

An object of the present invention is to provide a method of operating a combined cycle power generating system comprising combusting a fuel in a gas turbine, generating electricity and a steam of flue gas, producing a stream of steam in a heat recovery steam generator, producing a stream of concentrated carbon dioxide using an absorption unit and a solvent regeneration unit, forwarding the steam stream to a steam turbine and transferring the heat energy in the stream exiting the steam turbine to the solvent regeneration unit, and a thermal storage unit for storing heat energy, the method further comprising: operating a thermal storage unit, at least for a period of time, in a heat storing mode, in which a stream of steam from the stream exiting the steam turbine is condensed and transfers heat energy to heat storing means in the thermal storage unit, and operating the thermal storage unit, at least for a period of time, in a heat releasing mode, in which heat energy stored in the thermal storage unit is transferred to the solvent regeneration unit.

According to one embodiment, the method comprises establishing whether the system operates at a first load or at a second load, wherein the second load is a lower load than the first load, controlling said system to operate in the releasing mode when the system operates at the first load, and controlling the system to stop operation in the releasing mode when the system operates at the second load.

According to one embodiment, the method comprises establishing whether the system operates at a first time of the day or at a second time of the day, controlling said system to operate in the releasing mode when time reaches said first time of the day, and controlling the system to stop operation in the releasing mode when time reaches said second time of the day.

According to one embodiment, the method further comprises
establishing whether the system operates at a third load or at a fourth load, wherein the fourth load is a lower load than the third load,
controlling the system to operate in the storing mode when the system operates at the fourth load, and
controlling the system to stop operation in the storing mode when the system operates at the third load, wherein a stock of heat energy is built up when the system operates at the fourth load.

According to one embodiment, the method further comprises
establishing whether the system operates at a third time of the day or at a fourth time of the day,
controlling the system to operate in the storing mode when time reaches said fourth time of the day, and
controlling the system to stop operation in the storing mode when time reaches said third time of the day,
wherein a stock of heat energy is built up when the system operates at the fourth time of the day.

According to one embodiment, the fourth load is a lower load than the first load.

According to one embodiment, the first time of the day is the same as the third time of the day and the second time of the day is the same as the fourth time of the day.

According to one embodiment, the method further comprises storing concentrated carbon dioxide in a carbon dioxide buffer unit, during said releasing mode.

According to one embodiment, the method further comprises compressing the concentrated carbon dioxide into liquid form in a carbon dioxide compression unit, during said storing mode.

Another object of the present invention is to provide a combined cycle power generating system comprising
a gas turbine, in which electricity and a steam of flue gas is generated;
a heat recovery steam generator producing steam;
an absorption unit and
a solvent regeneration unit for producing a stream of concentrated carbon dioxide;
a steam turbine;
said combined cycle power plant further comprising:
a thermal storage unit, operative at least for a period of time in a heat storing mode, in which a stream of steam from the stream exiting the steam turbine is condensed and transfer heat energy to heat storing means in the thermal storage unit, and operative at least for a period of time in a heat releasing mode, in which heat energy stored in the thermal storage unit is transferred to the solvent regeneration unit.

According to one embodiment, the combined cycle power generating system further comprises a controlling device which controls the combined cycle power plant to operate in the heat storing mode or heat releasing mode based on a measured demand from the grid or load on the combined cycle power plant or a specific time of the day, respectively.

According to one embodiment, the combined cycle power generating system further comprises a carbon dioxide buffer unit for storing the concentrated carbon dioxide.

According to one embodiment, the combined cycle power generating system further comprises a carbon dioxide compression unit for compressing the concentrated carbon dioxide into liquid form.

According to one embodiment, the combined cycle power generating system further comprises
a carbon dioxide rich solvent buffer unit, operative during said heat releasing mode in storing rich solvent from the absorption unit, and operative during said heat storing mode in forwarding the solvent to the solvent regeneration unit.

According to one embodiment, the combined cycle power generating system further comprises
a carbon dioxide lean solvent unit, operative during said heat storing mode in storing lean solvent from the solvent regeneration unit, and operative during said heat releasing mode in forwarding solvent to the absorption unit.

Yet another object of the present invention is to provide a combined cycle power plant comprising said combined cycle power generating system.

BRIEF DESCRIPTION OF THE DRAWINGS

Referring now to the figures, which are exemplary embodiments, and wherein alike elements are numbered alike.

DETAILED DESCRIPTION

The present invention relates to a flexible gas turbine based power generation system, comprising a gas turbine, a heat recovery steam generator (HRSG), a steam turbine, a carbon capturing unit, a solvent regeneration unit, a thermal storage unit, a carbon dioxide buffering unit, and a compression unit, optionally the system further comprises buffering units for $CO_2$ lean and rich solvent.

In accordance with the present invention, a process and system to remove $CO_2$ from gas streams, having increased operational flexibility, is provided.

The present method establishes the load set point of the power plant selected by the plant operator. The load set point will depend on the demand of electricity from the grid and on the economical operation (electricity price), wherein the electricity price generally higher when the grid demand is higher and vice versa. With the present method and system the operator will be able to increase the power output of the plant when the grid demand and the electricity price accordingly are high by reducing the $CO_2$ capture related electrical auxiliary losses.

By providing limit values on the demand for when a storing mode and a releasing mode of heat, respectively, are to be active the method is switching between the modes based on a demand value measured on grid during operation. The releasing mode is to be active during a high demand from the grid, resulting in a high load dispatched to the grid by the power plant. The demand of electricity from the grid is considered high when the demand is at least 80% of maximum capacity of the gas turbine based power generation plant operated without $CO_2$ capture, i.e. 80-100%, preferably 95-100%.

Figure 3:
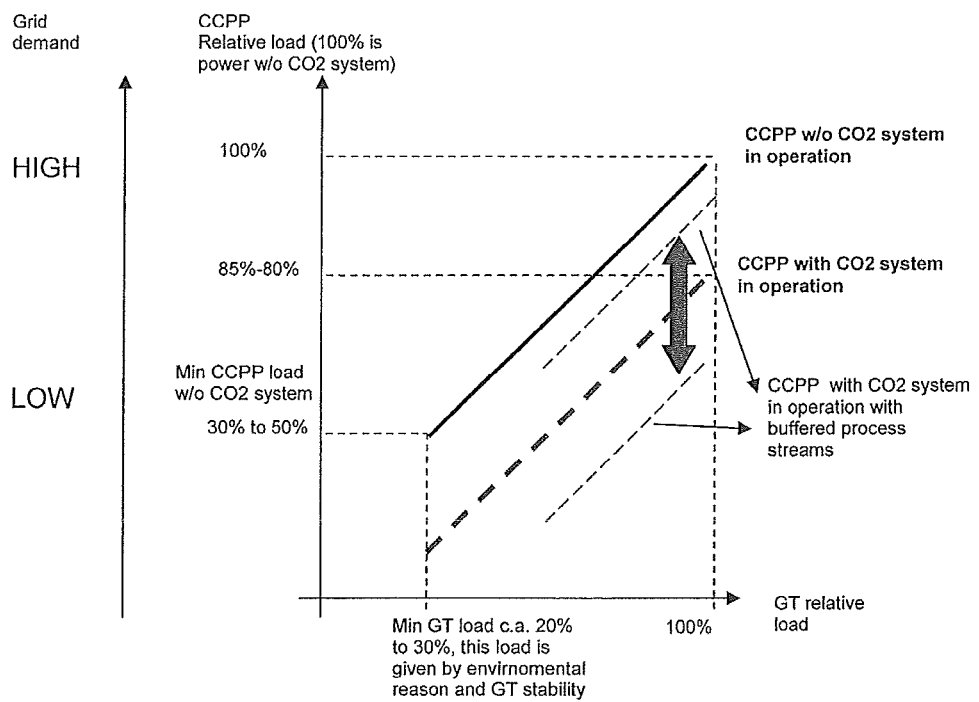
FIG. 3 is a graph showing the differences in relative load of a gas turbine based combined cycle power plant to gas turbine (GT) relative load using without $CO_2$ capture, and $CO_2$ capture with and without buffered process streams.

In a gas turbine based combined cycle power plant without $CO_2$ capture system, the maximum power output contributions are approximately ⅔ from the gas turbine and ⅓ from the steam turbine when the gas turbine is at the maximum firing temperature. In FIG. 3 the power output of the CCPP without the $CO_2$ capture system in operation and the CCPP with the $CO_2$ capture system in operation are shown versus the gas turbine (GT) relative load, with 100% being the GT power output at the maximum GT firing temperature. The CCPP load curve without $CO_2$ capture system in operation is shown as solid bold line, and the CCPP load curve with $CO_2$ capture system in operation is shown as dotted lines, wherein the dotted bold line is the CCPP with only $CO_2$ capture system and the dotted thinner lines are the CCPP with $CO_2$ capture system and buffering units during the modes of operation. It is clear that during operation of the CCPP with $CO_2$ capture system (bold dotted line), the use of the buffering units/system according to the present method is able to adjust the value of the relative load of the CCPP to increase the value during high demand from the grid (upper thin dotted line) and in return allow a decreased value during low demand from the grid (lower thin dotted line). Thanks to buffering of $CO_2$ related auxiliaries load, the power output of the CCPP with $CO_2$ capture system can be shifted and the load dispatched to the grid can be adjusted according to the grid demand, producing more electricity when grid demand is high.

The demand from the grid could also be specified as being high during certain periods of the day. A high demand may be specified as between 06.00 in the morning to 18.00 in the evening. The storing mode is to be active during a low demand from the grid, resulting in a low load on the system. The demand from the grid is considered low when the demand is below 80% of maximum capacity of the gas turbine based power generation plant operated without $CO_2$ capture, e.g. 0-79%, preferably 10-60%. The demand from the grid could also be specified as being low during certain periods of the day. A low demand may be specified as between 18.00 in the evening to 06.00 in the morning the day after.

The limit values of the system to operate in the releasing mode are set as a first and a second load or time of the day (e.g. specific hour). The limit value for a first load or time of the day is set to at least 80% of maximum capacity of the gas turbine based power generation plant without $CO_2$ capture system in operation or a specific time of the day, respectively, at which the system activates and operates in the releasing mode. The limit value for a second load is set to below 80% of maximum capacity of the gas turbine based power generation plant operated without $CO_2$ capture or a specific time of the day, respectively, at which the system deactivates the releasing mode.

The limit values of the system to operate in the storing mode are set as a third and a forth load. The limit value for a third load is set to at least 80% of maximum capacity of the gas turbine based power generation plant operated without $CO_2$ capture or a specific time of the day, respectively, at which the system deactivates the storing mode. The limit value for a forth load is set to below 80% of maximum capacity of the gas turbine based power generation plant operated without $CO_2$ capture or a specific time of the day, respectively, at which the system activates and operates in the storing mode.

The limit values for the first and third load may be different or the same. The limit values for the second and forth load may be different or the same.

The mode of operation of the system is controlled by a controlling device, such as a computer, microprocessor or controller, which compares the value of a measured current demand of electricity from the grid, load on the gas turbine based power generation system, or time of the day, with the set limit values and then regulate the process accordingly.

The streams of the combined cycle power generating system may be controlled, e.g. in terms of flow. The fluid streams in said system are forwarded by controlling in a per se known manner by the aid of e.g valves, actuators and/or pumps.

In order to exemplify the use of the different operation modes, releasing and storing mode, an example of an embodiment of the present method of operation is given below. If the gas turbine in the gas turbine based power generation system have a maximum production capacity of 100 MWe during full operation, a $CO_2$ capturing system when in use reduces the electricity output. When the $CO_2$ capturing system is in use the energy penalty may be about 20%. During a high demand from the grid only a maximum 80 MWe may be supplied when a $CO_2$ capturing system is used. This may result in not enough electricity dispatched to the grid and reduced profits. However, when using the present process and system all or at least part of the energy penalty may be postponed until the demand from the grid decreases and/or the economical plant load set point can be decreased. During a low demand from the grid only 50 MWe power outptut is needed. During this time an increased energy penalty is not influencing the demanded output from the gas turbine based power generation system. If the gas turbine based power generation system with the $CO_2$ capturing system in operation produces 50 MWe an additional 30 MWe penalty may be put on the system and the demand from the grid would still be fulfilled. If all of the energy penalty for the $CO_2$ capturing system could be postponed until the demand from the grid is low, the gas turbine based power generation system would be able to supply almost full output from the gas turbine to the grid and all of the energy penalty could be applied when the demand from the grid is low.

Figure 1:
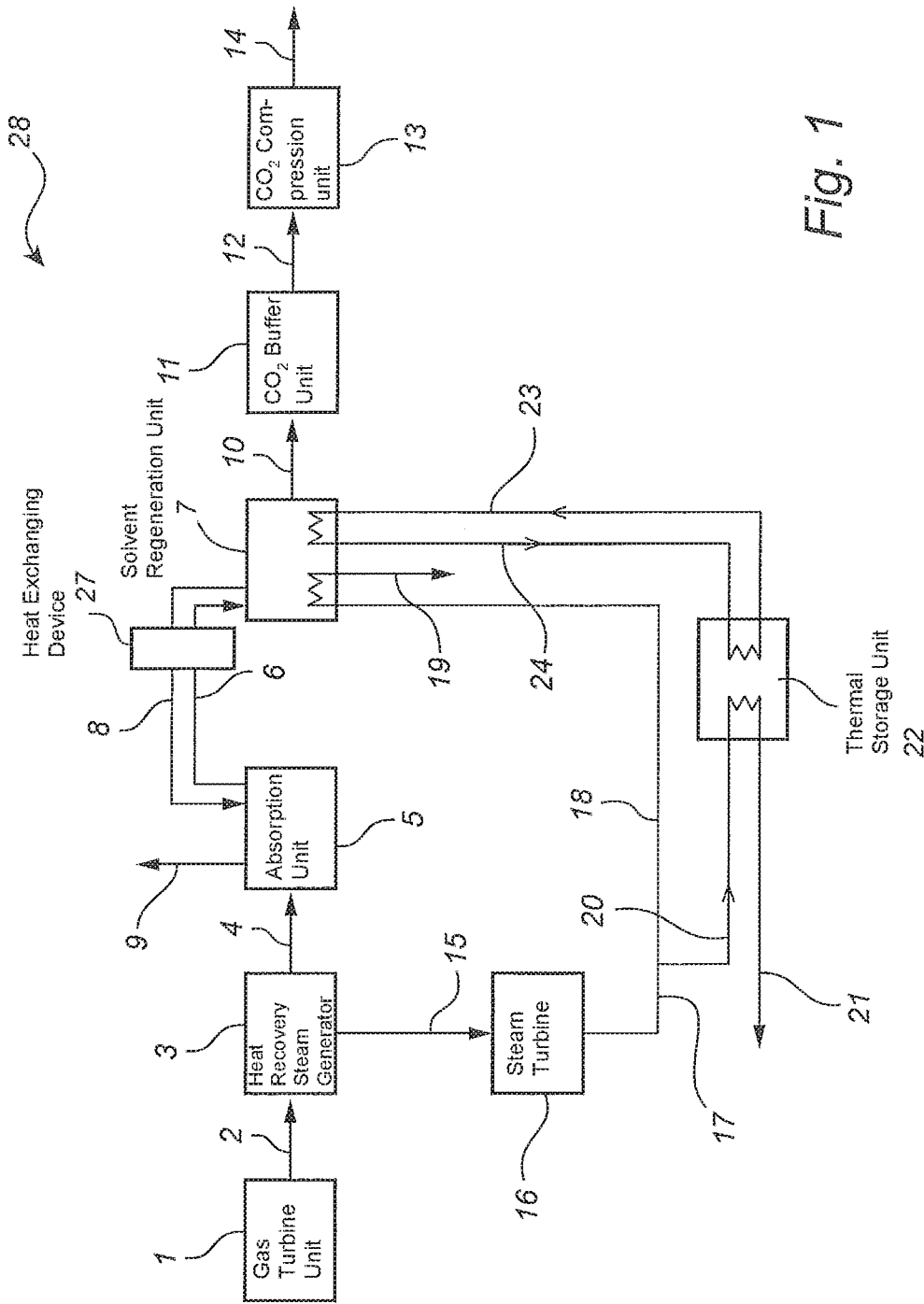
FIG. 1 is a schematic representation of a flexible system to capture contaminants and obtaining $CO_2$ from combustion gas, including storage of heat to be used at a different time and place in the process. The system includes gas generation, steam forming, $CO_2$ absorption, $CO_2$ regeneration and heat transfer between different streams in the system.
Figure 2:
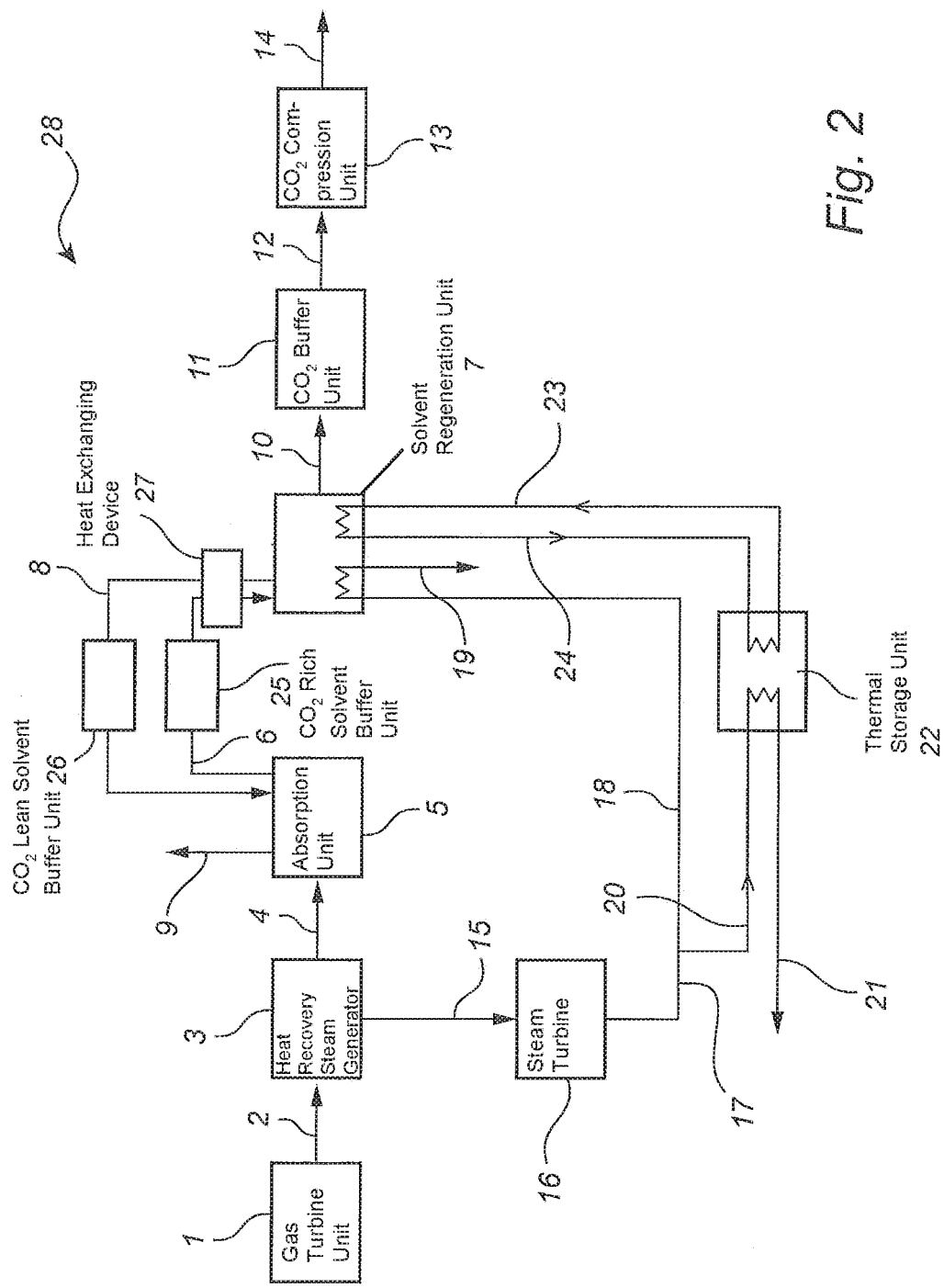
FIG. 2 is a schematic representation of another embodiment of a flexible system to capture contaminants and obtaining $CO_2$ from combustion gas. The system includes gas generation, steam forming, $CO_2$ absorption, $CO_2$ regeneration, heat transfer between different streams in the system and storage of absorption fluids.

The combined cycle power generating system and the method of operation of such a system will now be disclosed more in detail with reference to FIGS. 1 and 2. It is to be noted that not all streams or controlling means needed to operate a combined cycle power generating system may be disclosed in the figures. The FIGS. 1 and 2 are focusing on the main flow of the fuel becoming a $CO_2$ stream, which then is purified, separated and compressed but also on the provision of an additional transfer of heat energy to a solvent regeneration unit, which flow is dependent of fluctuations in process, in order make the combined cycle power generating system more flexible in terms of energy resource allocation, apparatus scaling and capacity.

FIG. 1 is a schematic representation of a combined cycle power generating system 28, as seen from the side thereof. The present disclosure provides a method of flexibly operating a gas turbine based power plant. A gas turbine unit 1 comprises a compressor for compression of inlet air, a combustor for combustion of a fuel with the compressed inlet air to form an exhaust gas, and a turbine for expansion of the exhaust gas. The exhaust gas from a gas turbine unit 1 may be partly recirculated, mixed with air before feeding the mixture as inlet air to the compressor.

The gas turbine unit 1 is followed by an exhaust gas treatment system, which comprises a heat recovery steam generator (HRSG) 3 recovering heat from a hot gas stream 2. A HRSG produces steam that can be used in a process (cogeneration) or used to drive a steam turbine (combined cycle). In the present case the HRSG 3 is connected by a stream 15 to a steam turbine 16, thus rendering the present system present a combined cycle power generating system. At least a part of the stream 17 from the steam turbine 16 is continuously or occasionally forwarded as a stream 18 into a solvent regeneration unit 7 and is used to transfer heat energy to said solvent regeneration unit 7. In the solvent regeneration unit 7 the stream 18 is cooled or condensed and is forwarded as stream 19 exiting the solvent regeneration unit 7.

The exhaust gas stream 4 forwarded from the HRSG 3 may be cleaned in a contaminant removal unit (not shown) to remove contaminants like $NO_x$, $SO_2$, $SO_3$, HCl, HF, mercury and particulate matter, e.g. PM2.5.

The exhaust gas of stream 4 is forwarded for treatment in an absorption unit 5, which comprises at least one $CO_2$ absorber. The absorption unit 5 may comprise a series of absorber stages, depending on the removal efficiency required and the operating conditions of the plant. Stream 9 leaving the absorption unit 5 being released to the atmosphere is a clean gas with low $CO_2$ concentration. Stream 8 is a $CO_2$-lean solvent forwarded from the solvent regeneration unit 7, which solvent is used as the absorbent to capture the $CO_2$ in the absorption unit 5. The resultant stream 6 is a $CO_2$-rich solvent which is forwarded to the solvent regeneration unit 7 for regeneration.

A stream 10 comprising concentrated $CO_2$ may be forwarded to a $CO_2$ buffer unit 11 for storage until use.

The solvent regeneration unit 7 operates at high pressure and elevated temperature and may be a single or a series of regeneration reactors. The pressure of the solvent fed to the regenerator, stream 6, may be elevated using high pressure pump (not shown). Typically, the pressure of stream 6 is in the range of 50-2500 psi, higher than the regenerator pressure to prevent premature evaporation of $CO_2$. Heat may be provided to the solvent regeneration unit 7 by a heater (not shown) and/or by heat energy originating from streams from a steam turbine 16. The high pressure and high temperature in the regeneration unit cause the release of high-pressure gaseous $CO_2$, stream 10. A high-pressure regeneration has major cost and energy advantage. Low quality thermal energy is used to generate the high pressure $CO_2$ stream instead of high-value electric power.

Optionally, the $CO_2$-rich stream 6 and the $CO_2$-lean stream 8 may be forwarded through a heat exchanging device 27 to transfer heat energy from the $CO_2$-lean stream 8 to the $CO_2$-rich stream 6.

After the $CO_2$ buffer unit 11 the concentrated $CO_2$ stream 12 may be forwarded into a compressor unit 13. During periods of low load, e.g. below 75%, the compression unit 13 work partly on recirculation.

To make the gas turbine based power generation system 28 more operationally flexible a stream 20 may be taken from the stream 17 from the steam turbine during a low demand from the grid. The stream 20 is forwarded to a thermal storage unit 22 comprising heat storing means (not shown). The steam of stream 20 is condensed in the thermal storage unit 22 and the formed heat energy from the condensation is transferred to the heat storing means. The heat storing means may for example be chosen from rocks, salt, sand, pressurized water, and thermal oil. A stream 21 comprising condensed steam is exiting the thermal storage unit 22.

The demand from the grid is not always constant. Thus, during periods of low demand, e.g. during night time when many workplaces and households are using less electricity, the system is storing some heat energy of steam 20 in the thermal storage unit 22. The stored heat energy may then be used when the demand from the grid increases. Also, the compression of concentrated $CO_2$ may be performed in the $CO_2$ compression unit 13 during periods of low load in order to optimize the energy output from the system during periods of high demand from the grid.

During periods of high demand from the grid, e.g. during day time when many workplaces and households are using more electricity (e.g. normal working hours), the system is using the heat energy stored in the thermal storage unit 22 to aid the regeneration of solvent in the solvent regeneration unit 7 in order to optimize the energy output from the system during periods high demand from the grid. A heat exchanging function between the thermal storage unit 22 and the solvent regeneration unit 7 is performed during high demand from the grid via a heat exchanging medium. A heat exchanging medium stream 23 transfers heat to the solvent regeneration unit 7 and via stream 24 is forwarded back to the thermal storage unit 22.

By saving some of the heat energy produced during periods of low demand from the grid in a heat storing unit 22, and using the heat energy during periods of low demand from the grid in the solvent regeneration unit 7 the operation of the system 28 is made more flexible, allowing a higher electrical output to the grid in times of a higher demand from the grid. Also, by storing concentrated $CO_2$ from the solvent regeneration unit 7 in a buffer unit 11 during periods of high demand from the grid, allows flexibility in the process to perform the following compression of the carbon dioxide in the $CO_2$ compression unit 13 when the energy demand from the grid is lower, thus not decreasing the maximum output from the system during a high demand from the grid.

The flow of streams 10, 12, 20, 21, 23, and 24 may be controlled by a controlling system which may e.g. comprise computer, micro processor, controller, valves, actuators and/or pumps, which system is not shown in the figures for the purpose of maintaining clarity of the illustration. Controlling the flows is done in a per se known manner.

FIG. 2 is a schematic representation of a combined cycle power generating system 28, as seen from the side thereof. Disclosed is a schematic representation another embodiment of a flexible system to capture contaminants and obtaining $CO_2$ from combustion gas. The system 28 includes gas generation, steam forming, $CO_2$ absorption, $CO_2$ regeneration, heat transfer between different streams in the system and storage of absorption fluids.

The system 28 comprises the same features as in previously mentioned FIG. 1 apart from the construction of storage of absorption fluids.

In this embodiment $CO_2$ lean solvent is produced and stored during periods of low demand from the grid and optionally low electricity prices, while being used in the absorption unit 5 during periods of high demand from the grid. Correspondingly $CO_2$ rich solvent is formed and stored during periods of high demand from the grid, while being regenerated in the absorption unit 5 during periods of low demand from the grid.

To optionally further increase the operational flexibility of the overall system disclosed in FIG. 1 a $CO_2$ rich solvent buffer unit 25 and a $CO_2$ lean solvent buffer unit 26 may be incorporated into the $CO_2$ rich stream 6 and the $CO_2$ lean stream 8, respectively. During high demand from the grid the solvent used in the absorption unit 5 exiting the unit as $CO_2$ rich stream 6 is be stored in a $CO_2$ rich solvent buffer unit 25, and the $CO_2$ lean stream 8 stored in the $CO_2$ lean solvent buffer unit 26 is to be used in the absorption unit 5. During low demand from the grid the solvent stored in the $CO_2$ rich solvent buffer unit 2 is forwarded to the solvent regeneration unit 7, in which the solvent is regenerated and forwarded as the $CO_2$ lean stream 8 to be stored in the $CO_2$ lean solvent buffer unit 26.

The flow of streams 6 and 8 passing the $CO_2$ rich solvent buffer unit 25 and $CO_2$ lean solvent buffer unit 26, respectively, may be controlled by a controlling system which may e.g. comprise computer, micro processor, controller, valves, actuators and/or pumps, which system is not shown in the figures for the purpose of maintaining clarity of the illustration. Controlling the flows is done in a per se known manner. Naturally, more streams than the ones disclosed having controlling systems herein may comprise such.

The difference in demand of electricity from the grid triggers the change of plant load set point; when the load set point exceeds the maximum power output capacity with $CO_2$ in operation then the plant controller imposes the use of stored thermal energy and when the load set point is lower then the plant controller operate in order to store thermal energy. When the demand from the grid reaches a specified value the system 28 changes mode from a first heat storing mode including compression of the carbon dioxide, optionally including regeneration of stored $CO_2$ rich solvent of stream 6 to a second heat using mode including concentrated $CO_2$ buffering, optionally including usage of stored $CO_2$ lean solvent of stream 8, or the other way around. When the demand is high, e.g. at least a demand of at least 80% of maximum capacity of the gas turbine based power generation plant operated without $CO_2$ capture or a specific hour, respectively, the first mode is activated to facilitate heat storage and performing energy intensive parts of the process. When the demand is lower, e.g. below a load of 80% of maximum capacity of the gas turbine based power generation plant operated without $CO_2$ capture or a specific hour, respectively, the second mode is activated to facilitate usage of stored heat and storing of concentrated $CO_2$, optionally including usage of stored $CO_2$ lean stream 8 which is to be fed into the absorption unit 5 when the load increases.

Optionally, the $CO_2$-rich stream 6 and the $CO_2$-lean stream 8 may pass through a heat exchanging device 27 to transfer heat energy from the $CO_2$-lean stream 8 to the $CO_2$-rich stream 6.

This combination of internal heat transfer results in a decreased overall energy consumption. By transferring heat energy by condensation of steam from a steam turbine 16 to a storage unit 22 during periods of low load on the system 28 or during certain times of the day, the stored heat energy may be transferred to the solvent regeneration unit 7 when the load on the system 28 increase (and/or the energy prices increases) or during certain other times of the day.

Further, by using a $CO_2$ buffer unit 11, which stores concentrated $CO_2$ during periods of high load on the system or during certain times of the day, and possibly high energy prices, the concentrated $CO_2$ may then proceed to the compression unit 13 when the electricity costs are lower and the load on the system 28 is lower. By using the $CO_2$ buffer unit 11 the design of the compressor unit 13 may be influenced, may be scaled down and may work under a less fluctuation mode, i.e. more uniformly distributed load.

To make the process even more flexible $CO_2$ lean solvent may be produced and stored during periods of low load and optionally low electricity prices. By allowing the solvent regeneration unit 7 to increase the work load during periods of normally low load or during certain times of the day, a buffer of $CO_2$ lean solvent may be built up, which in turn is used when the load on the system 28 increases or during certain other times of the day. During high load or certain times the formed $CO_2$ rich solvent in the absorption unit 5 may be stored, waiting to be regenerated when the load on the system decreases or other certain times of the day comes, and optionally also a difference in electricity prices. As the regeneration process demands a lot of heat energy at least a part of it may be supplied from other parts of the system or part of the regeneration process to put off until periods of lower electricity prices.

By making the regeneration of the solvent in the solvent regeneration unit 7 dependent on the load on the system or certain times of the day and optionally current energy prices further savings may be made. Thus, by using heat energy from other parts of the process the overall energy consumption is decreased. Also by adapting the process to different load cycles or hours of the day the process may be optimized in view of energy consumption. By making the process more flexible, the output of electricity to the grid is optimized during periods of a high demand from the grid, often also including high electricity prices, and parts of the system needing energy based on electricity may during periods of high demand from the grid and high priced electricity be shifted to periods of low priced electricity and a low demand from the grid.

It will be appreciated that numerous variants of the embodiments described above are possible within the scope of the appended claims.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of operating a combined cycle power generating system comprising:
   combusting a fuel in a gas turbine to generate electricity and a stream of flue gas;
   producing a stream of steam in a heat recovery steam generator using the stream of flue gas;
   directing the stream of steam to a steam turbine;
   forwarding a first portion of the stream of steam exiting the steam turbine to a solvent regeneration unit to transfer heat therein and forwarding a second portion of the stream of steam exiting the steam turbine to a thermal storage unit;
   operating the thermal storage unit, for a first predefined time period, in a heat storing mode, in which the second portion of the stream of steam exiting the steam turbine is condensed and transfers heat energy to heat storing means in the thermal storage unit; and
   operating the thermal storage unit, for a second predefined time period, in a heat releasing mode, in which the heat energy stored in the thermal storage unit is transferred to the solvent regeneration unit.

2. The method according to claim 1, further comprising:
   establishing whether the system operates at a first load or at a second load, wherein the second load is a lower load than the first load;
   controlling said system to operate in the neat releasing mode when the system operates at the first load, and controlling the system to stop operation in the heat releasing mode when the system operates at the second load.

3. The method according to claim 2, further comprising:
establishing whether the system operates at a third load or at a fourth load, wherein the fourth load is a lower load than the third load;
controlling the system to operate in the heat storing mode when the system operates at the fourth load; and
controlling the system to stop operation in the heat storing mode when the system operates at the third load,
wherein a stock of heat energy is built up when the system operates at the fourth load.

4. The method according to claim 3, wherein the fourth load is a lower load than the first load.

5. The method according to claim 1, further comprising:
establishing whether the system operates at a first time of the day or at a second time of the day;
controlling said system to operate in the heat releasing mode when time reaches said first time of the day, and controlling the system to stop operation in the heat releasing mode when time reaches said second time of the day.

6. The method according to claim 5, further comprising:
establishing whether the system operates at a third time of the day or at a fourth time of the day;
controlling the system to operate in the heat storing mode when time reaches said fourth time of the day; and
controlling the system to stop operation in the heat storing mode when time reaches said third time of the day,
wherein a stock of heat energy is built up when the system operates at the fourth time of the day.

7. The method according to claim 6, wherein the first time of the day is same as the third time of the day and the second time of the day is same as the fourth time of the day.

8. The method according to claim 1, further comprising storing concentrated carbon dioxide in a carbon dioxide buffer unit, during said heat releasing mode.

9. The method according to claim 1, further comprising compressing concentrated carbon dioxide into liquid form in a carbon dioxide compression unit, during said heat storing mode.

10. The method according to claim 1, further comprising storing $CO_2$ rich solvent from an absorption unit in a carbon dioxide rich solvent buffer unit for at least a period of time.

11. The method according to claim 1, further comprising storing $CO_2$ lean solvent from the solvent regeneration unit in a carbon dioxide lean solvent buffer unit for at least a period of time.

12. A combined cycle power generating system comprising:
a gas turbine, in which electricity and a stream of flue gas is generated;
a heat recovery steam generator producing a stream of steam from heat in the stream of flue gas;
a steam turbine driven by the stream of steam wherein a first portion of the stream of steam exiting the steam turbine is directed to a solvent regeneration unit and a second portion of the stream of steam exiting the steam turbine is directed to a thermal storage unit; and
the thermal storage unit, operative for a first predefined time period in a heat storing mode, in which the second portion of the stream of steam exiting the steam turbine is condensed and transfers heat energy to heat storing means in the thermal storage unit, and operative for a second predefined time period in a heat releasing mode, in which the heat energy stored in the thermal storage unit is transferred to the solvent regeneration unit,
wherein the solvent regeneration unit and an absorption unit is used for producing a stream of concentrated carbon dioxide.

13. The combined cycle power generating system according to claim 12, further comprising a controlling device which controls the combined cycle power generating system to operate in the heat storing mode or in the heat releasing mode based on a measured demand from a grid or load on the combined cycle power generating system or a specific time of the day, respectively.

14. The combined cycle power generating system according to claim 12, further comprising a carbon dioxide buffer unit for storing the concentrated carbon dioxide.

15. The combined cycle power generating system according to claim 12, further comprising a carbon dioxide compression unit for compressing the concentrated carbon dioxide into liquid form.

16. The combined cycle power generating system according to claim 12, further comprising
a carbon dioxide rich solvent buffer unit, operative during said heat releasing mode in storing rich solvent from the absorption unit, and operative during said heat storing mode in forwarding the solvent to the solvent regeneration unit.

17. The combined cycle power generating system according to claim 12, further comprising
a carbon dioxide lean solvent unit, operative during said heat storing mode in storing lean solvent from the solvent regeneration unit, and operative during said heat releasing mode in forwarding the solvent to the absorption unit.

18. A combined cycle power plant comprising the system according to claim 12.

* * * * *